United States Patent
Kum et al.

(10) Patent No.: US 11,754,701 B2
(45) Date of Patent: Sep. 12, 2023

(54) ELECTRONIC DEVICE FOR CAMERA AND RADAR SENSOR FUSION-BASED THREE-DIMENSIONAL OBJECT DETECTION AND OPERATING METHOD THEREOF

(71) Applicant: Korea Advanced Institute of Science and Technology, Daejeon (KR)

(72) Inventors: Dongsuk Kum, Daejeon (KR); YoungSeok Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 139 days.

(21) Appl. No.: 17/199,043

(22) Filed: Mar. 11, 2021

(65) Prior Publication Data
US 2021/0295090 A1    Sep. 23, 2021

(30) Foreign Application Priority Data
Mar. 17, 2020   (KR) .......................... 10-2020-0032410

(51) Int. Cl.
*G01S 13/86*   (2006.01)
*G06T 7/70*    (2017.01)
(Continued)

(52) U.S. Cl.
CPC ............ *G01S 13/867* (2013.01); *G01S 13/89* (2013.01); *G06F 18/253* (2023.01); *G06T 7/60* (2013.01); *G06T 7/70* (2017.01); *G06V 10/25* (2022.01); *G06V 10/80* (2022.01); *G06V 20/56* (2022.01); *G06V 20/64* (2022.01);
(Continued)

(58) Field of Classification Search
CPC .. G06K 9/629; G06T 7/70; G06T 7/60; G06T 2207/10028; G06T 2207/20076; G06T 2207/20221; G06T 2207/30252; G01S 13/867; G01S 13/89
See application file for complete search history.

(56) References Cited

U.S. PATENT DOCUMENTS

| 10,346,693 | B1 * | 7/2019 | Kim ................... G06F 18/2163 |
| 2018/0068473 | A1 * | 3/2018 | Tico ........................ G06T 11/60 |

FOREIGN PATENT DOCUMENTS

KR    10-2019-0131207    11/2019

OTHER PUBLICATIONS

Over Zhao et al., Fusion of 3D Lidar and Camera Data for Object Detection in Autonomous Vehicle Applications, Jan. 2020, IEEE (Year: 2020).*

(Continued)

*Primary Examiner* — Wednel Cadeau
(74) *Attorney, Agent, or Firm* — CHRISTENSEN O'CONNOR JOHNSON KINDLESS PLLC

(57) ABSTRACT

An electronic device and an operating method thereof according to various embodiments are intended to detect a three-dimensional (3D) object based on camera module and radar sensor fusion, and may be configured to extract a first region of interest (RoI) from a first feature map extracted from first sensing data obtained through a camera module, extract a second RoI from a second feature map extracted from second sensing data obtained through a radar sensor, generate a third RoI by fusing the first RoI and the second RoI, and detect a 3D object based on the third RoI.

16 Claims, 9 Drawing Sheets

(51) Int. Cl.
*G01S 13/89* (2006.01)
*G06T 7/60* (2017.01)
*G06V 10/25* (2022.01)
*G06V 20/64* (2022.01)
*G06F 18/25* (2023.01)
*G06V 10/80* (2022.01)
*G06V 20/56* (2022.01)

(52) U.S. Cl.
CPC ............... *G06T 2207/10028* (2013.01); *G06T 2207/20076* (2013.01); *G06T 2207/20221* (2013.01); *G06T 2207/30252* (2013.01)

(56) References Cited

OTHER PUBLICATIONS

Zhao et al. (Fusion of 3D Lidar and Camera Data for Object Detection in Autonomous Vehicle Applications, Jan. 2020, IEEE (Year: 2020).*

Yecheol Kim, et al., "3D Vehicle Detection based on Camera Lidar Sensor Fusion," *The Korean Society of Automotive Engineers*, vol. 5, pp. 830-832 (2019).

Seongyong Ahn, et al., "A Robust Method for Lane Detection at Day/Night Time with 3D LIDAR and Camera," *The Institute of Electronics and Information Engineers*, vol. 6, pp. 912-915 (2018).

YoungSeok Kim, et al., "Fault Tolerant Vehicle Detection Using Camera-LiDAR Sensor Fusion : Multi-channel Faster R-CNN," *The Korean Society of Automotive Engineers*, vol. 6, pp. 829-831 (2018).

Lin et al., "Feature Pyramid Networks for Object Detection," Proceedings of 2017 IEEE Conf. on Computer Vision and Pattern Recognition (CVPR) (Jul. 2017), pp. 2117-2125.

Ren et al., "SBNet: Sparse Blocks Network for Fast Inference," Proceedings of 2018 IEEE/CVF Conf. on Computer Vision and Pattern Recognition (CVPR) (Jun. 2018), 10 pages.

Ren et al., "Faster R-CNN: Towards Real-Time Object Detection with Region Proposal Networks," IEEE Transactions on Pattern Analysis and Machine Intelligence (Jun. 2017)., vol. 39, Issue 6, pp. 1137-1149.

Kim et al., "GRIF Net: Gated Region of Interest Fusion Network for Robust 3D Object Detection from Radar Point Cloud and Monocular Image," IEEE International Workshop on Intelligent Robots and Systems (IROS) (Oct. 2020), 9 pages.

* cited by examiner

ELECTRONIC DEVICE FOR CAMERA AND RADAR SENSOR FUSION-BASED THREE-DIMENSIONAL OBJECT DETECTION AND OPERATING METHOD THEREOF

CROSS-REFERENCES TO RELATED APPLICATION

This application is based on and claims priority under 35 U.S.C. 119 to Korean Patent Application No. 10-2020-0032410, filed on Mar. 17, 2020 in the Korean intellectual property office, the disclosure of which is herein incorporated by reference in its entirety.

TECHNICAL FIELD

Various embodiments relate to an electronic device for camera and radar sensor fusion-based three-dimensional (3D) object detection and an operating method thereof.

BACKGROUND OF THE INVENTION

Recently, research of intelligent vehicle technologies, such as autonomous driving and an advanced driver assistance systems (ADAS), is actively carried out. In particular, the importance of an object recognition technology for recognizing an obstacle and an environment around a vehicle while driving is emerging. However, it is difficult to expect for an object recognition technology using one sensor to have high accuracy because inherent limitations of the sensor cannot be overcome, and the object recognition technology has a problem in that it may not handle a failure, etc. of the sensor. In order to overcome such a problem, an object recognition technology using different types of sensors is being developed. According to the object recognition technology using different types of sensors, results detected using the sensors are compared, thereby an error is removed, such that the accuracy of the object recognition technology is improved. However, the improvement width of accuracy of the object recognition technology is small because overcoming the limitations of each sensor is not considered.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Various embodiments provide an electronic device capable of improving the accuracy of an object recognition technology and an operating method thereof.

Various embodiments provide an electronic device capable of providing an object recognition technology using different types of sensors and an operating method thereof.

Various embodiments provide an electronic device capable of improving the accuracy of an object recognition technology while overcoming the limitations of each sensor and an operating method thereof.

Various embodiments provide an electronic device for camera module and radar sensor fusion-based three-dimensional (3D) object detection and an operating method thereof.

According to various embodiments, an operating method of the electronic device may include extracting a first region of interest (RoI) from a first feature map extracted from first sensing data, extracting a second RoI from a second feature map extracted from second sensing data, generating a third RoI by fusing the first RoI and the second RoI, and detecting a three-dimensional (3D) object based on the third RoI.

According to various embodiments, an electronic device includes a memory and a processor coupled to the memory and configured to execute at least one instruction stored in the memory. The processor may be configured to extract a first region of interest (RoI) from a first feature map extracted from first sensing data, extract a second RoI from a second feature map extracted from second sensing data, generate a third RoI by fusing the first RoI and the second RoI, and detect a three-dimensional (3D) object based on the third RoI.

According to various embodiments, a non-transitory computer-readable storage medium may store one or more programs for executing an operation of extracting a first region of interest (RoI) from a first feature map extracted from first sensing data, an operation of extracting a second RoI from a second feature map extracted from second sensing data, an operation of generating a third RoI by fusing the first RoI and the second RoI, and an operation of detecting a three-dimensional (3D) object based on the third RoI.

According to various embodiments, the electronic device may fuse a first RoI extracted from first sensing data and a second RoI extracted from second sensing data, and may detect a 3D object based on the fusion. That is, the electronic device may fuse the first RoI and the second RoI corresponding to the first sensing data and the second sensing data, respectively, without generally fusing the first sensing data and the second sensing data. Accordingly, the limitations of at least one of the first sensing data or the second sensing data can be overcome. Furthermore, in detecting the 3D object, improved accuracy can be indicated with a low computational load. For example, the limitations of at least one of the camera module or the sensor module in obtaining the first sensing data through the camera module or obtaining the second sensing data through the sensor module including at least any one of a radar sensor or a LiDAR sensor can be overcome, and accuracy and reliability in detecting the 3D object can also be improved. Accordingly, reliability and stability of a vehicle including the electronic device can be improved because the vehicle can flexibly handle various situations.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Hereinafter, various embodiments of this document are described with reference to the accompanying drawings.

Figure 1:
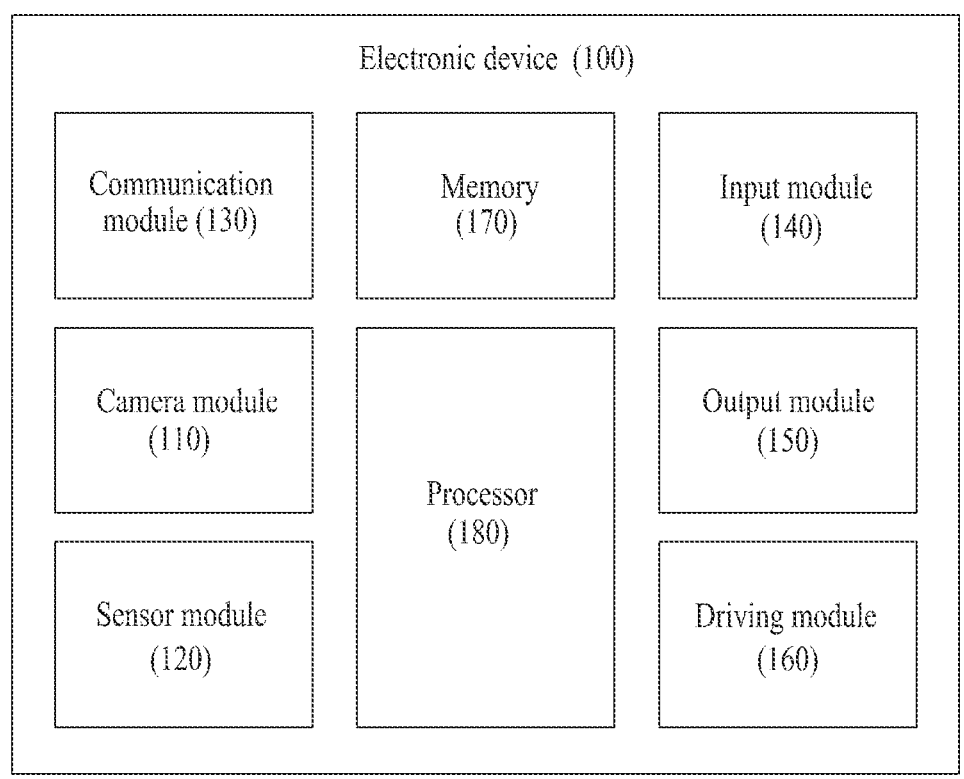
FIG. 1 is a diagram illustrating an electronic device according to various embodiments.
Figure 2:
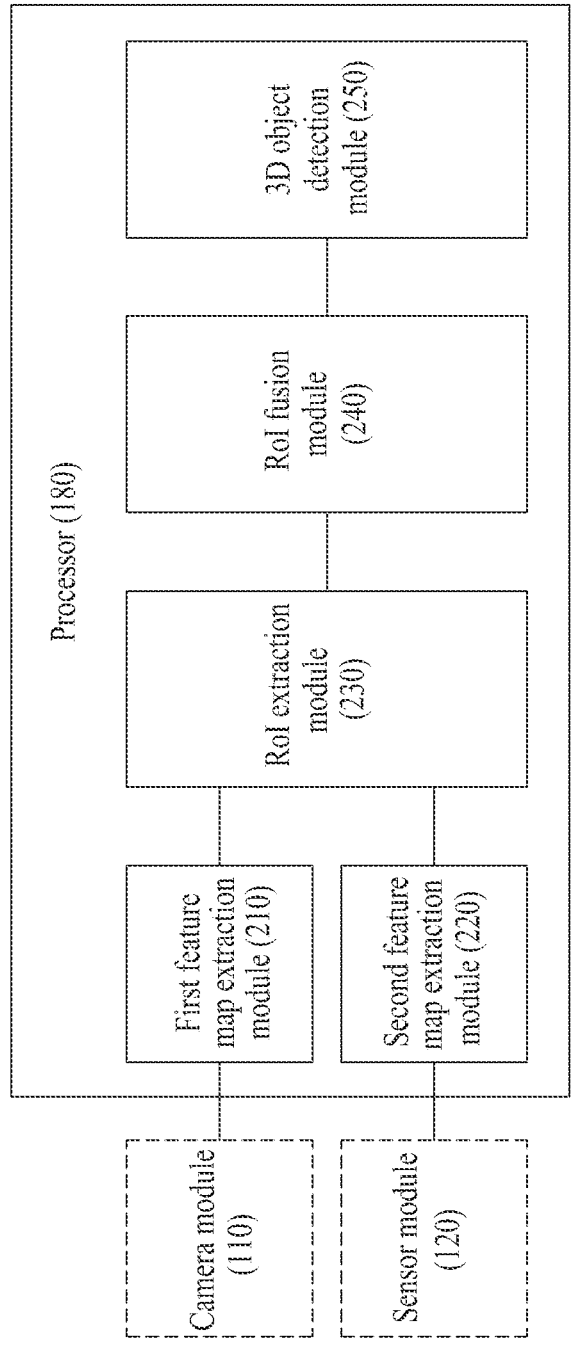
FIG. 2 is a diagram illustrating a processor of FIG. 1.

FIG. 1 is a diagram illustrating an electronic device 100 according to various embodiments. FIG. 2 is a diagram illustrating a processor 180 of FIG. 1. FIGS. 3, 4, 5 and 6 are diagrams for describing an operational flow of the electronic device 100 according to various embodiments.

Referring to FIG. 1, the electronic device 100 according to various embodiments may include at least any one of a camera module 110, a sensor module 120, a communication module 130, an input module 140, an output module 150, a driving module 160, a memory 170 or a processor 180. In an embodiment, at least any one of the components of the electronic device 100 may be omitted or one or more other components may be added to the electronic device 100. According to an embodiment, the electronic device 100 may be an autonomous vehicle. According to another embodiment, the electronic device 100 may be mounted on a vehicle, and may implement an autonomous vehicle. According to another embodiment, the electronic device 100 may be a monitoring system.

The camera module 110 may capture an external image of the electronic device 100. In this case, the camera module 110 may be installed at a predetermined location of the electronic device 100, and may capture the external image. Furthermore, the camera module 110 may generate image data for the external image of the electronic device 100. For example, the camera module 110 may include at least any one of a lens, at least one image sensor, an image signal processor or a flash. For example, the camera module 110 may be an RGB camera. For another example, the camera module 110 may be an infrared camera.

The sensor module 120 may detect a state of the electronic device 100 or an external environment of the electronic device 100. Furthermore, the sensor module 120 may generate sensing data for the state of the electronic device 100 or the external environment of the electronic device 100. For example, the sensor module 120 may include at least any one of an acceleration sensor, a gyroscope sensor, an image sensor, a radar sensor, a LiDAR sensor or an ultrasonic sensor.

The communication module 130 may support communication between the electronic device 100 and an external device (not illustrated). In this case, the communication module 130 may include at least any one of a wireless communication module or a wired communication module. According to an embodiment, the wireless communication module may support at least any one of a long distance communication method or a short distance communication method. The short distance communication method may include at least any one of Bluetooth, Wi-Fi direct or infrared data association (IrDA), for example. The wireless communication method may perform communication using the long distance communication method over a network. The network may include at least any one of a cellular network, the Internet, or a computer network such as a local area network (LAN) or a wide area network (WAN), for example. According to another embodiment, the wireless communication module may support communication with a global navigation satellite system (GNSS). For example, the GNSS may include a global positioning system (GPS).

The input module 140 may receive, from the outside of the electronic device 100, an instruction or data to be used in at least any one of the components of the electronic device 100. For example, the input module 140 may include at least any one of a microphone, a mouse or a keyboard. In an embodiment, the input module may include at least any one of touch circuitry configured to detect a touch or a sensor circuit configured to measure the intensity of a force generated by a touch.

The output module 150 may provide information to the outside of the electronic device 100. In this case, the output module 150 may include at least any one of a display module or an audio module. The display module may visually output information. For example, the display module may include at least any one of a display, a hologram device or a projector. In an embodiment, the display module may be assembled with at least any one of the touch circuitry or sensor circuit of the input module 140 and may be implemented as a touch screen. The audio module may output information in a sound form. For example, the audio module may include at least any one of a speaker or a receiver.

The driving module 160 may operate for an operation of the electronic device 100. According to an embodiment, if the electronic device 100 is an autonomous vehicle, the driving module 160 may include various parts. According to another embodiment, if the electronic device 100 is mounted on a vehicle and implements an autonomous vehicle, the driving module 160 may be connected to various parts of the vehicle. Accordingly, the driving module 160 may operate while controlling at least any one of the parts. For example, the parts may include at least any one of an engine module, an acceleration module, a braking module, a steering module or a navigation module.

The memory 170 may store at least any one of a program or data used by at least any one of the components of the electronic device 100. For example, the memory 170 may include at least any one of a volatile memory or a nonvolatile memory.

The processor 180 may control at least any one of the components of the electronic device 100 by executing a program of the memory 170, and may perform data processing or an operation. The processor 180 may collect information on a surrounding environment of the electronic device 100. In this case, the processor 180 may obtain first sensing data and second sensing data. The processor 180 may recognize a three-dimensional (3D) object in a surrounding environment of the electronic device 100 based on information on the surrounding environment of the electronic device 100. In this case, the processor 180 may detect the 3D object based on the first sensing data and the second sensing data. Accordingly, the processor 180 may control an operation of the electronic device 100 based on the 3D object in the surrounding environment of the electronic device 100. To this end, the processor 180 may control the driving module 160. For example, as illustrated in FIG. 2, the processor 180 may include a first feature map extraction module 210, a second feature map extraction module 220, a region of interest (RoI) extraction module 230, a RoI fusion module 240 and a 3D object detection module 250.

Figure 3:
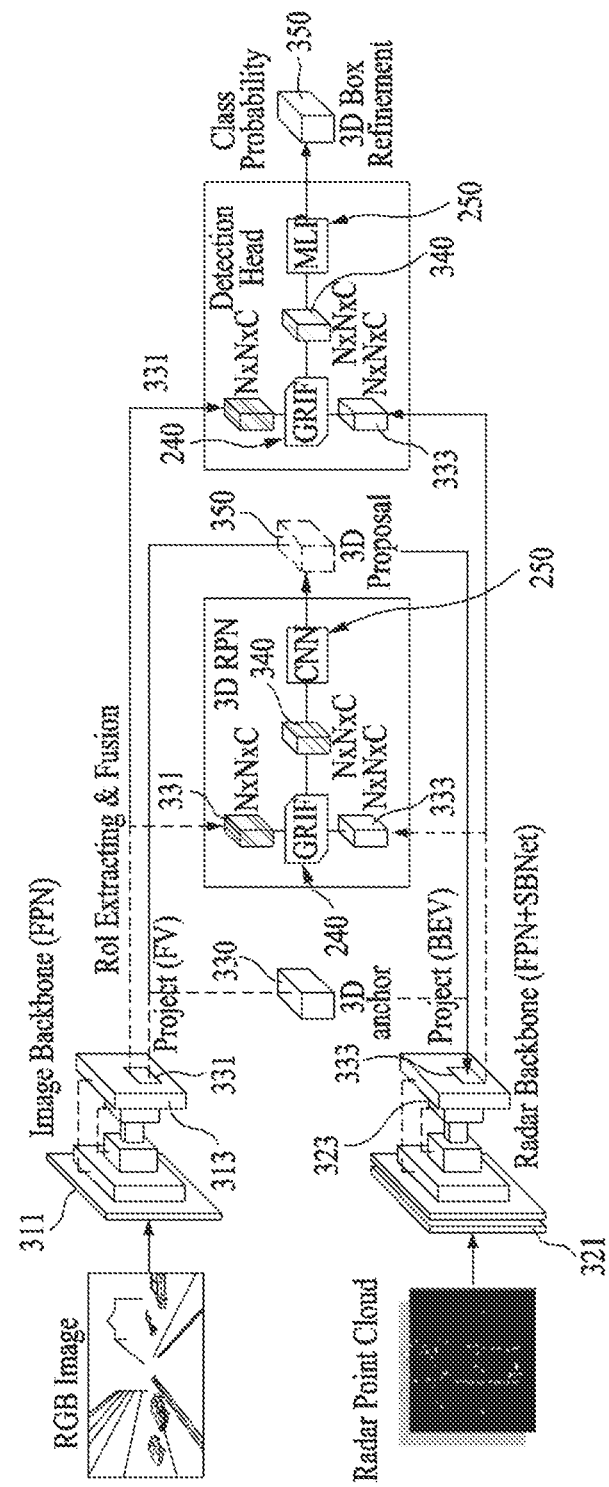
FIGS. 3, 4, 5 and 6 are diagrams for describing an operational flow of the electronic device according to various embodiments.

The processor 180 may extract the first feature map 313 from first sensing data 311. The first sensing data 311 may include image data obtained through the camera module 110. In this case, the first sensing data 311 has first resolution and a first coordinate system, and the first feature map 313 may also have the first resolution and the first coordinate system. For example, as illustrated in FIG. 3, the first feature map extraction module 210 may extract the first feature map 313 from the first sensing data 311. The first feature map extraction module 210 may use at least any one of a convolutional neural network (CNN) or histograms of oriented gradients (HOG), for example.

The processor 180 may extract a second feature map 323 from second sensing data 321. The second sensing data 321 may include sensing data obtained through the sensor module 120. For example, the second sensing data 321 may include point cloud data obtained through at least one of a radar sensor or a LiDAR sensor. In this case, the second sensing data 321 has second resolution and a second coordinate system, and the second feature map 323 may also have the second resolution and the second coordinate system. For example, as illustrated in FIG. 3, the second feature map extraction module 220 may extract the second feature map 323 from the second sensing data 321. The second feature map extraction module 220 may use at least any one of a CNN or HOG, for example.

Figure 4:
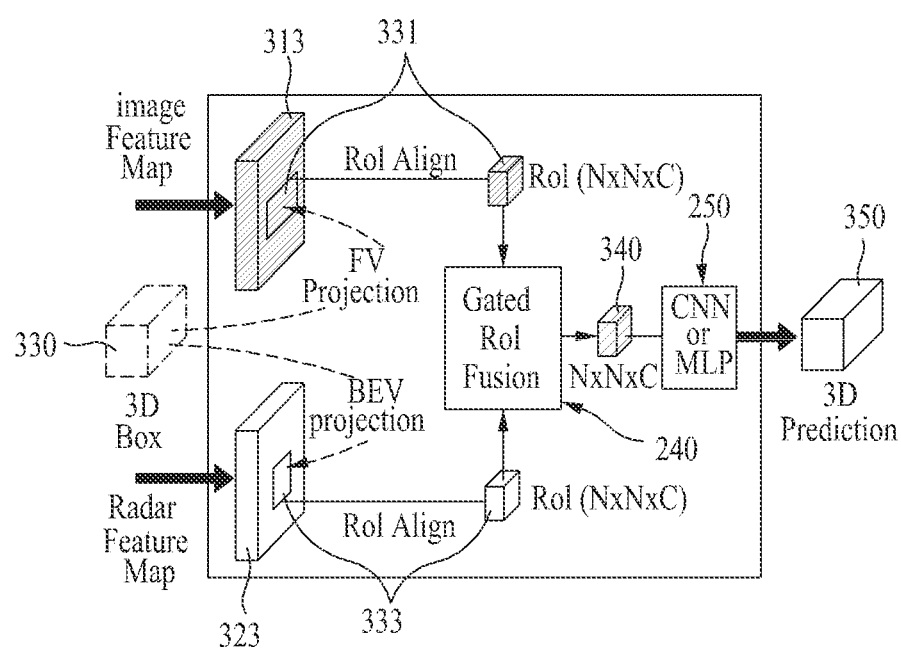

The processor 180 may extract regions of interest (RoIs) 331 and 333 corresponding to each other, that is, a first RoI 331 and a second RoI 333, from the first feature map 313 and the second feature map 323, respectively. In this case, the first RoI 331 and the second RoI 333 may have the same size. For example, as illustrated in FIG. 3, the RoI extraction module 230 may extract the first RoI 331 from the first feature map 313, and may extract the second RoI 333 from the second feature map 323. As illustrated in FIG. 3 or 4, the RoI extraction module 230 may extract the first RoI 331 in accordance with a 3D box 330 from the first feature map 313 by projecting the 3D box 330 having a predetermined size onto the first coordinate system of the first sensing data 311 using a projection matrix. Accordingly, the RoI extraction module 230 may extract the first RoI 331 regardless of the first coordinate system of the first sensing data 311. Likewise, as illustrated in FIG. 3 or 4, the RoI extraction module 230 may extract the second RoI 333 in accordance with the 3D box 330 from the second feature map 323 by projecting the 3D box 330 onto the second coordinate system of the second sensing data 321 using the projection matrix. Accordingly, the RoI extraction module 230 may extract the second RoI 333 regardless of the second coordinate system of the second sensing data 321. In this case, as in Equation 1 below, the RoI extraction module 230 may project the 3D box 330 onto the first coordinate system of the first sensing data 311 or the second coordinate system of the second sensing data 321 using the projection matrix.

$$\text{RoI}_v = T_{3D \to v}(\text{box}_{3D}), v \in \{FV, BEV\} \quad (1)$$

The processor 180 may fuse the first RoI 331 and the second RoI 333 into one, that is, a third RoI 340. In this case, the third RoI 340 may be formed to have the same size as the first RoI 331 and the second RoI 333. For example, as illustrated in FIG. 3 or 4, the RoI fusion module 240 may generate the third RoI 340 by fusing the first RoI 331 and the second RoI 333. The RoI fusion module 240 may use at least any one of a concatenation operation, an addition operation or a mean operation, for example. In this case, as in Equation 2 below, the RoI fusion module 240 may assign weights ($w^{Mi}$) 531 and 533 to the RoIs ($f^{Mi}$) 331 and 333, respectively, and may fuse the first RoI 331 and the second RoI 333 based on the weights. For example, when the weights ($w^{Mi}$) 531 and 533 are 1, the RoI fusion module 240 may generate the third RoI 340 as the sum of the first RoI 331 and the second RoI 333. When the weights ($w^{Mi}$) 531 and 533 are 0.5, the RoI fusion module 240 may generate the third RoI 340 as the mean of the first RoI 331 and the second RoI 333. For another example, as a data state of each of the RoIs ($f^{Mi}$) 331 and 333 is better, each weight closer to 1 may be assigned to a corresponding RoI. As a data state of each of the RoIs ($f^{Mi}$) 331 and 333 is poorer, each weight closer to 0 may be assigned to a corresponding RoI.

$$F_{fusion} = \sum_{i=1}^{n} w^{M_i} \cdot f^{M_i} \quad (2)$$

Figure 5:
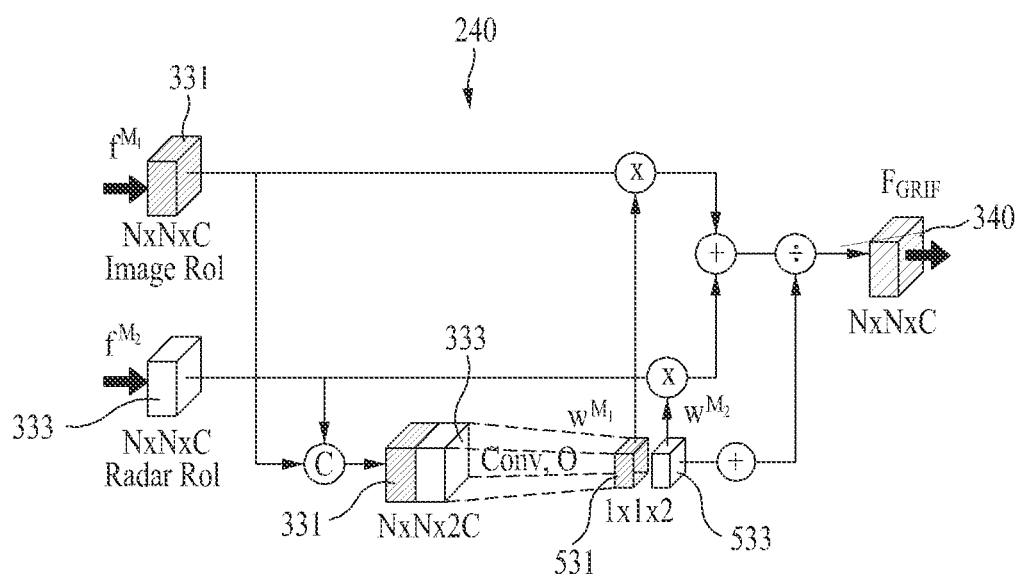
Figure 6:
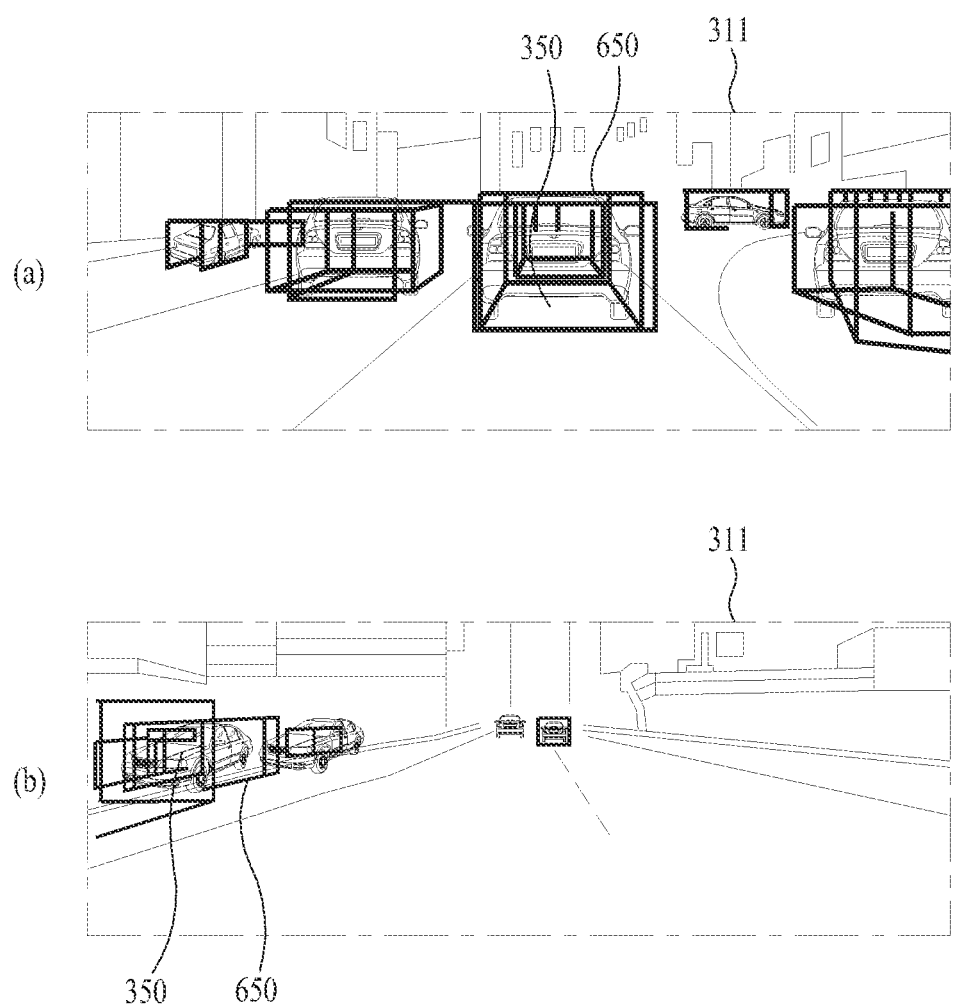

According to an embodiment, as illustrated in FIG. 5, the RoI fusion module 240 may generate the third RoI 340 from the first RoI 331 and the second RoI 333 based on the first weight 531 and the second weight 533 for the first RoI 331 and the second RoI 333. To this end, the RoI fusion module 240 may calculate the first weight 531 and the second weight 533 for the first RoI 331 and the second RoI 333, respectively. In this case, the RoI fusion module 240 may calculate the first weight 531 and the second weight 533 from the fusion of the first RoI 331 and the second RoI 333 through at least any one of a convolutional neural network (CNN), multi-layer perceptron (MLP), regression analysis or a support vector machine (SVM), for example. For example, when a data state of the first RoI 331 is poor, the first weight 531 may be determined to be low. When a data state of the first RoI 331 is good, the first weight 531 may be determined to be high. Likewise, when a data state of the second RoI 333 is poor, the second weight 533 may be determined to be low. When a data state of the second RoI 333 is good, the second weight 533 may be determined to be high. Furthermore, the RoI fusion module 240 may obtain a first weighted area by multiplying the first RoI 331 by the first weight 531, and may obtain a second weighted area by multiplying the second RoI 333 by the second weight 533. Accordingly, the RoI fusion module 240 may generate the third RoI 340 by dividing the sum of the first weighted area and the second weighted area by the sum of the first weight 531 and the second weight 533.

The processor 180 may detect a 3D object 350 based on the third RoI 340. For example, as illustrated in FIG. 3 or 4, the 3D object detection module 250 may determine the 3D object 350 based on the third RoI 340. The 3D object detection module 250 may use at least any one of a convolutional neural network (CNN), multi-layer perceptron (MLP), regression analysis or a support vector machine (SVM), for example. In this case, the 3D object detection module 250 may detect information on the 3D object 350. The information on the 3D object 350 may include at least any one of a probability that the 3D object 350 will be present in the third RoI 340, and the location, size or direction of the 3D object 350. In this case, the 3D object detection module 250 may detect the probability that the 3D object 350 will be present in the third RoI 340. Furthermore, the 3D object detection module 250 may detect at least any one of the location, size or direction of the 3D object 350 based on the probability that the 3D object 350 will be present in the third RoI 340. For example, when the probability that the 3D object 350 will be present in the third RoI 340 is more than a predetermined threshold, the 3D object detection module 250 may detect at least any one of the location, size or direction of the 3D object 350.

Accordingly, the electronic device 100 may output the information on the 3D object 350. For example, as illustrated in FIG. 6(a) or 6(b), the processor 180 may display a 3D cell 650, surrounding the 3D object 350, in the first sensing data 311, for example, image data, through the output module 150. In this case, the location and size of the 3D cell 650 may indicate the location and size of the 3D object 350, respectively. For another example, the processor 180 may transmit the information on the 3D object 350 to an external device through the communication module 130.

Figure 7:
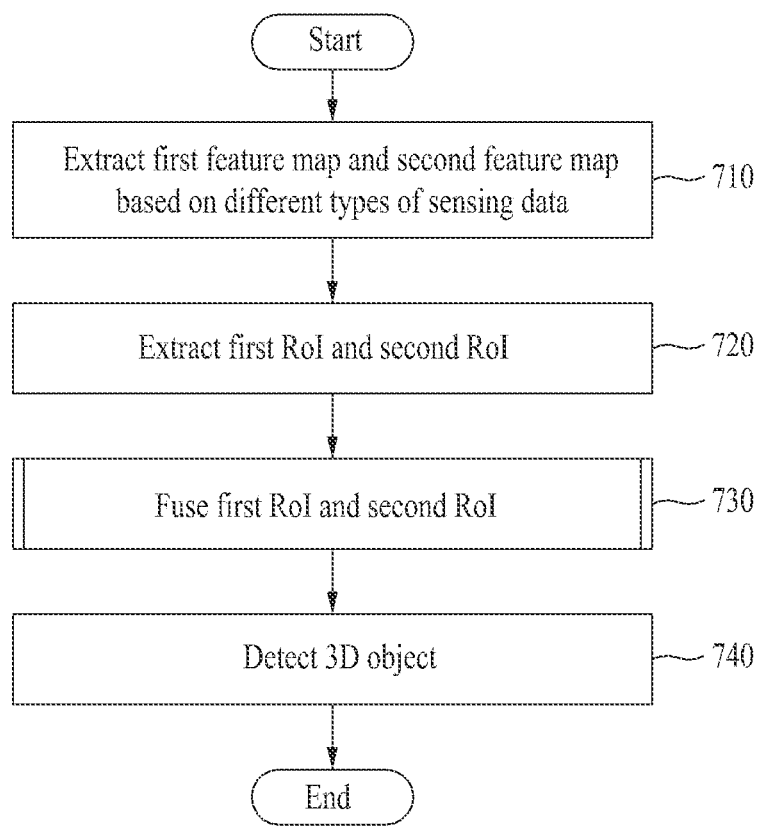
FIG. 7 is a diagram illustrating an operating method of the electronic device according to various embodiments.

FIG. 7 is a diagram illustrating an operating method of the electronic device 100 according to various embodiments.

Referring to FIG. 7, at operation 710, the electronic device 100 may extract the first feature map 313 and the second feature map 323 based on the different types of sensing data 311 and 321. The processor 180 may obtain the first sensing data 311 and the second sensing data 321. The first sensing data 311 may include image data obtained through the camera module 110. In this case, the first sensing data 311 may have first resolution and a first coordinate system. The second sensing data 321 may include sensing data obtained through the sensor module 120. For example, the second sensing data 321 may include point cloud data obtained 중 through at least one of a radar sensor or a LiDAR sensor. In this case, the second sensing data 321 may have second resolution and a second coordinate system. Thereafter, the processor 180 may extract the first feature map 313 and the second feature map 323 from the first sensing data 311 and the second sensing data 321, respectively. For example, as illustrated in FIG. 3, the first feature map extraction module 210 may extract the first feature map 313 from the first sensing data 311. As illustrated in FIG. 3, the second feature map extraction module 220 may extract the second feature map 323 from the second sensing data 321. In this case, the first feature map 313 may have the first resolution and the first coordinate system, and the second feature map 323 may have the second resolution and the second coordinate system. The first feature map extraction module 210 and the second feature map extraction module 220 may extract the first feature map 313 and the second feature map 323, respectively, using at least any one of a CNN or HOG, for example.

At operation 720, the electronic device 100 may extract the first RoI 331 and the second RoI 333 corresponding to each other from the first feature map 313 and the second feature map 323, respectively. As illustrated in FIG. 3, the processor 180 may extract the first RoI 331 from the first feature map 313 and extract the second RoI 333 from the second feature map 323. In this case, the first RoI 331 and the second RoI 333 may have the same size. As illustrated in FIG. 3 or 4, the RoI extraction module 230 may extract the first RoI 331 in accordance with the 3D box 330 from the first feature map 313 by projecting the 3D box 330 having a predetermined size onto the first coordinate system of the first sensing data 311 using a projection matrix. Accordingly, the RoI extraction module 230 may extract the first RoI 331 regardless of the first coordinate system of the first sensing data 311. Likewise, as illustrated in FIG. 3 or 4, the RoI extraction module 230 may extract the second RoI 333 in accordance with the 3D box 330 from the second feature map 323 by projecting the 3D box 330 onto the second coordinate system of the second sensing data 321 using the projection matrix. Accordingly, the RoI extraction module 230 may extract the second RoI 333 regardless of the second coordinate system of the second sensing data 321.

At operation 730, the electronic device 100 may fuse the first RoI 331 and the second RoI 333. The processor 180 may fuse the first RoI 331 and the second RoI 333 into the third RoI 340. In this case, the third RoI 340 may be formed to have the same size as the first RoI 331 and the second RoI 333. For example, as illustrated in FIG. 3 or 4, the RoI fusion module 240 may generate the third RoI 340 by fusing the first RoI 331 and the second RoI 333. The RoI fusion module 240 may use at least any one of a concatenation operation, an addition operation or a mean operation, for example. According to an embodiment, the RoI fusion module 240 may assign the first weight 351 and the second weight 353 to the first RoI 331 and the second RoI 333, respectively, and may fuse the first RoI 331 and the second RoI 333 based on the weights. This will be described later with reference to FIG. 8.

Figure 8:
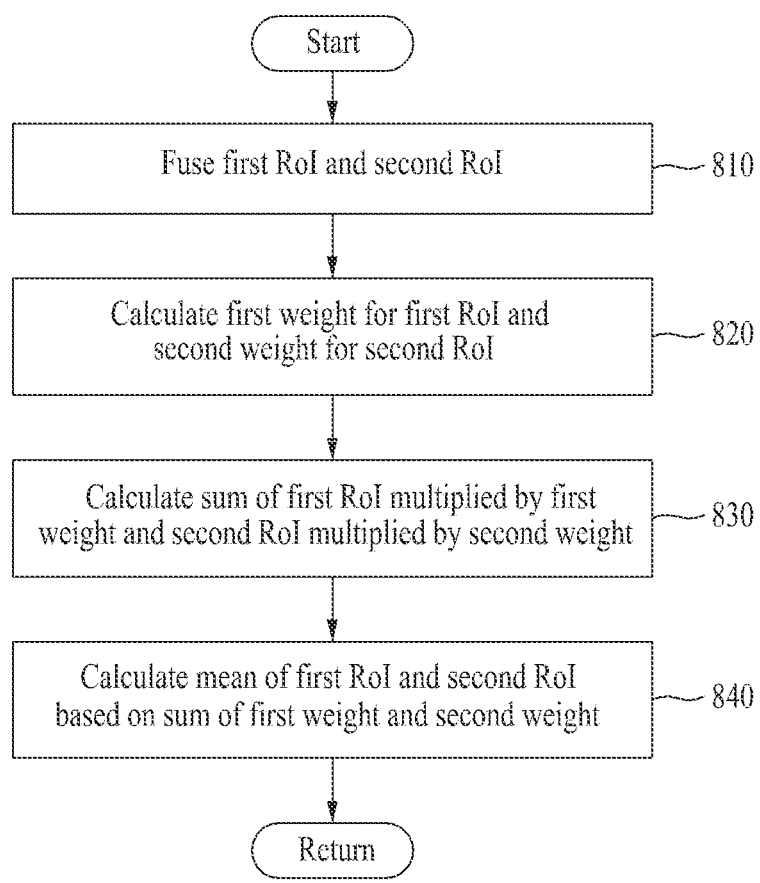
FIG. 8 is a diagram illustrating an operation of fusing a first RoI and second RoI in FIG. 7.

FIG. 8 is a diagram illustrating an operation of fusing the first ROI and second ROI in FIG. 7.

Referring to FIG. 8, at operation 810, the electronic device 100 may fuse the first RoI 331 and the second RoI 333. Furthermore, at operation 820, the electronic device 100 may calculate the first weight 531 for the first RoI 331 and the second weight 533 for the second RoI 333. The processor 180 may calculate the first weight 531 and the second weight 533 from the fusion of the first RoI 331 and the second RoI 333, respectively. For example, the RoI fusion module 240 may calculate the first weight 531 and the second weight 533 from the fusion of the first RoI 331 and the second RoI 333, respectively, through at least one of a CNN, MLP, regression analysis or an SVM, for example. For example, when a data state of the first RoI 331 is poor, the first weight 531 may be determined to be low. When a data state of the first RoI 331 is good, the first weight 531 may be determined to be high. Likewise, when a data state of the second RoI 333 is poor, the second weight 533 may be determined to be low. When a data state of the second RoI 333 is good, the second weight 533 may be determined to be high.

At operation 830, the electronic device 100 may calculate the sum of the first RoI 331 multiplied by the first weight 531 and the second RoI 333 multiplied by the second weight 533. The processor 180 may obtain a first weighted area by multiplying the first RoI 331 by the first weight 531, and may obtain a second weighted area by multiplying the second RoI 333 by the second weight 533. Furthermore, the processor 180 may calculate the sum of the first weighted area and the second weighted area.

At operation 840, the electronic device 100 may calculate the mean of the first RoI 331 and the second RoI 333 based on the sum of the first weight 531 and the second weight 533. The processor 180 may divide the sum of the first weighted area and the second weighted area by the sum of the first weight 531 and the second weight 533. Accordingly, the processor 180 may generate the third RoI 340. Thereafter, the electronic device 100 may return to FIG. 7 and perform operation 740.

Referring back to FIG. 7, at operation 740, the electronic device 100 may determine the 3D object 350 based on the third RoI 340. As illustrated in FIG. 3 or 4, the processor 180 may detect the 3D object 350 based on the third RoI 340. In this case, the 3D object detection module 250 may detect information on the 3D object 350. The 3D object detection module 250 may use at least any one of a CNN, MLP, regression analysis or an SVM, for example. The information on the 3D object 350 may include at least any one of a probability that the 3D object 350 will be present in the third RoI 340, and the location, size or direction of the 3D object 350. In this case, the 3D object detection module 250 may detect the probability that the 3D object 350 will be present in the third RoI 340. Furthermore, the 3D object detection module 250 may detect at least any one of the location, size or direction of the 3D object 350 based on the probability that the 3D object 350 will be present in the third RoI 340.

For example, when the probability that the 3D object 350 will be present in the third RoI 340 is more than a predetermined threshold, the 3D object detection module 250 may detect at least any one of the location, size or direction of the 3D object 350.

Accordingly, the electronic device 100 may output the information on the 3D object 350. For example, as illustrated in FIG. 6(a) or 6(b), the processor 180 may display the 3D cell 650, surrounding the 3D object 350, in the first sensing data 311, for example, image data through the output module 150. In this case, the location and size of the 3D cell 650 may indicate the location and size of the 3D object 350, respectively. For another example, the processor 180 may transmit the information on the 3D object 350 to an external device through the communication module 130.

Figure 9:
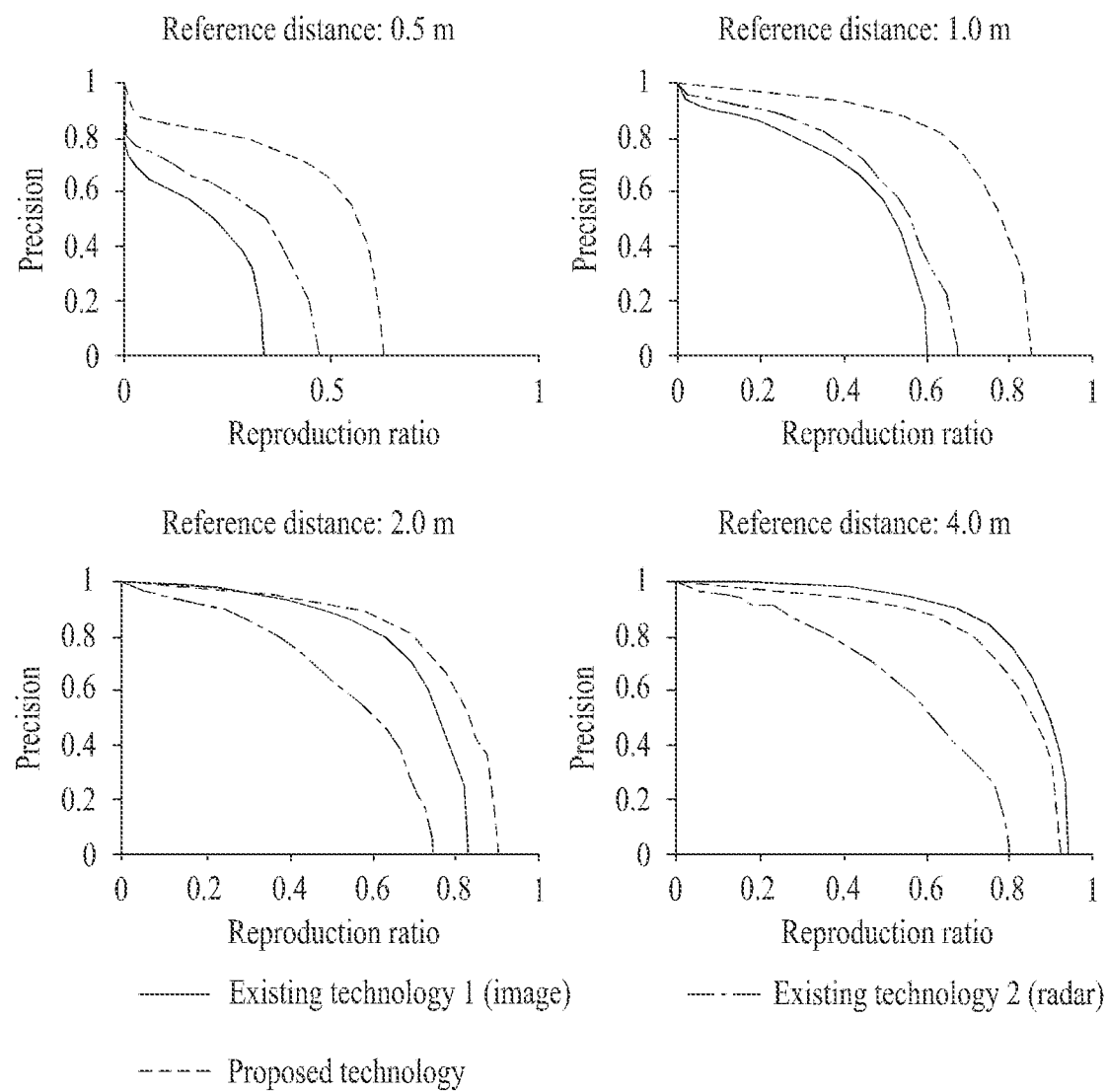
FIG. 9 is a diagram for describing an operational effect of the electronic device according to various embodiments.

According to various embodiments, the electronic device 100 may fuse the first RoI 331 extracted from the first sensing data 311 and the second RoI 333 extracted from the second sensing data 321, and may detect the 3D object 350 from the fusion. That is, the electronic device 100 does not generally fuse the first sensing data 311 and the second sensing data 321, and may fuse the first RoI 331 and the second RoI 333 corresponding to each other in the first sensing data 311 and the second sensing data 321. Accordingly, the limitations of at least any one of the first sensing data 311 or the second sensing data 313 can be overcome. Furthermore, in detecting the 3D object 350, improved accuracy can be indicated even through a low computational load. For example, the limitations of at least one of the camera module 110 or the sensor module 120 in obtaining the first sensing data 311 through the camera module 110 and obtaining the second sensing data 321 through the sensor module 120 including at least any one of a radar sensor or a LiDAR sensor can be overcome, and accuracy and reliability in detecting the 3D object 350 can be improved. Accordingly, reliability and stability of a vehicle can be improved because the vehicle including the electronic device 100 can flexibly handle various situations. FIG. 9 is a diagram for describing an operational effect of the electronic device 100 according to various embodiments.

Referring to FIG. 9, precision and a reproduction ratio of the electronic device 100 according to various embodiments are excellent compared to precision and a reproduction ratio of technologies using the existing single sensor. That is, the electronic device 100 according to various embodiments can improve accuracy and reliability in detecting the 3D object 350 compared to the existing technologies because the electronic device 100 operates using the camera module 110 and the sensor module 120.

An operating method of the electronic device 100 according to various embodiments may include extracting the first RoI 331 from the first feature map 313 extracted from the first sensing data 311, extracting the second RoI 333 from the second feature map 323 extracted from the second sensing data 321, generating the third RoI 340 by fusing the first RoI 331 and the second RoI 333, and detecting the 3D object 350 based on the third RoI 340.

According to various embodiments, the first sensing data 311 may include image data obtained through the camera module, and the second sensing data 321 may include point cloud data obtained through at least any one of a radar sensor or a LiDAR sensor.

According to various embodiments, the extracting of the first RoI 331 may include extracting the first RoI 331 from the first feature map 313 by projecting the 3D box 330 onto the first coordinate system of the first sensing data 311 using a projection matrix.

According to various embodiments, the extracting of the second RoI 333 may include extracting the second RoI 333 from the second feature map 323 by projecting the 3D box 330 onto the second coordinate system of the second sensing data 321 using the projection matrix.

According to various embodiments, the generating of the third RoI 340 may include calculating the first weight 531 and the second weight 533 for the first RoI 331 and the second RoI 333, respectively, and generating the third RoI 340 from the first RoI 331 and the second RoI 333 based on the first weight 531 and the second weight 533.

According to various embodiments, the generating of the third RoI 340 based on the first weight 531 and the second weight 533 may include obtaining a first weighted area by multiplying the first RoI 331 by the first weight 531, obtaining a second weighted area by multiplying the second RoI 333 by the second weight 533, and generating the third RoI 340 by dividing the sum of the first weighted area and the second weighted area by the sum of the first weight 531 and the second weight 533.

According to various embodiments, the calculating of the first weight 531 and the second weight 533 may include an operation of calculating the first weight 531 and the second weight 533 from the fusion of the first RoI 331 and the second RoI 333, respectively, through at least one of a CNN, MLP, regression analysis or an SVM, for example.

According to various embodiments, the detecting of the 3D object 350 includes an operation of detecting information on the 3D object 350. The information on the 3D object 350 may include at least any one of the location, size or direction of the 3D object 350.

According to various embodiments, the detecting of the 3D object 350 includes detecting a probability that the 3D object 350 will be present in the third RoI 340 and detecting at least any one of the location, size or direction of the 3D object 350 based on the probability. The information on the 3D object 350 may further include the probability that the 3D object 350 will be present in the third RoI 340.

The electronic device 100 according to various embodiments may include the memory 170, and the processor 180 coupled to the memory 170 and configured to execute at least one instruction stored in the memory 170.

According to various embodiments, the processor 180 may be configured to extract the first RoI 331 from the first feature map 313 extracted from the first sensing data 311, extract the second RoI 333 from the second feature map 323 extracted from the second sensing data 321, generate the third RoI by fusing the first RoI 331 and the second RoI 333, and detect the 3D object 350 based on the third RoI 340.

According to various embodiments, the electronic device 100 may further include the camera module 110, and the sensor module 120 including at least any one of a radar sensor or a LiDAR sensor.

According to various embodiments, the processor 180 may be configured to obtain the first sensing data 311 through the camera module 110 and to obtain the second sensing data through the sensor module 120.

According to various embodiments, the processor 180 may be configured to extract the first RoI 331 from the first feature map 313 by projecting the 3D box 330 onto the first coordinate system of the first sensing data 311 using a projection matrix.

According to various embodiments, the processor 180 may be configured to extract the second RoI 333 from the second feature map 323 by projecting the 3D box 330 onto the second coordinate system of the second sensing data 321 using a projection matrix.

According to various embodiments, the processor 180 may be configured to calculate the first weight 531 and the second weight 533 for the first RoI 331 and the second RoI 333, respectively, and to generate the third RoI 340 from the first RoI 331 and the second RoI 333 based on the first weight 531 and the second weight 533.

According to various embodiments, the processor 180 may be configured to obtain a first weighted area by multiplying the first RoI 331 by the first weight 531, obtain a second weighted area by multiplying the second RoI 333 by the second weight 533, and generate the third RoI 340 by dividing the sum of the first weighted area and the second weighted area by the sum of the first weight 531 and the second weight 533.

According to various embodiments, the processor 180 may be configured to calculate the first weight 531 and the second weight 533 from the fusion of the first RoI 331 and the second RoI 333, respectively, through at least one of a CNN, MLP, regression analysis or an SVM, for example.

According to various embodiments, the processor 180 may be configured to detect information on the 3D object 350. The information on the 3D object 350 may include at least any one of the location, size or direction of the 3D object 350.

According to various embodiments, the processor 180 may be configured to detect a probability that the 3D object 350 will be present in the third RoI 340 and to detect at least any one of the location, size or direction of the 3D object 350 based on the probability. The information on the 3D object 350 may further include the probability that the 3D object 350 will be present in the third RoI 340.

Various embodiments of this document may be implemented as software including one or more instructions stored in a storage medium (e.g., the memory 170) readable by a machine (e.g., the electronic device 100). For example, a processor (e.g., the processor 180) of the machine may invoke at least one of the one or more instructions stored in the storage medium, and may execute the instruction. This enables the machine to operate to perform at least one function based on the invoked at least one instruction. The one or more instructions may include a code generated by a complier or a code executable by an interpreter. The storage medium readable by the machine may be provided in the form of a non-transitory storage medium. In this case, the term "non-transitory" merely means that the storage medium is a tangible device and does not include a signal (e.g., electromagnetic wave). The term does not distinguish between a case where data is semi-permanently stored in the storage medium and a case where data is temporally stored in the storage medium.

A non-transitory computer-readable storage medium according to various embodiments may store one or more programs for executing the operation of extracting the first RoI 331 from the first feature map 313 extracted from the first sensing data 311, the operation of extracting the second RoI 333 from the second feature map 323 extracted from the second sensing data 321, the operation of generating the third RoI 340 by fusing the first RoI 331 and the second RoI 333, and the operation of detecting the 3D object 350 based on the third RoI 340.

According to various embodiments, the first sensing data 311 may include the image data obtained through the camera module. The second sensing data 321 may include point cloud data obtained through at least any one of a radar sensor or a LiDAR sensor.

The embodiments of this document and the terms used in the embodiments are not intended to limit the technology described in this document to a specific embodiment, but should be construed as including various changes, equivalents and/or alternatives of a corresponding embodiment. In the description of the drawings, similar reference numerals may be used in similar components. An expression of the singular number may include an expression of the plural number unless clearly defined otherwise in the context. In this document, an expression, such as "A or B", "at least one of A and/or B", "A, B or C" or "at least one of A, B and/or C", may include all of possible combinations of listed items together. Expressions, such as "a first," "a second," "the first" and "the second", may modify corresponding components regardless of their sequence or importance, and are used to only distinguish one component from the other component and do not limit corresponding components. When it is described that one (e.g., first) component is "(functionally or communicatively) connected to" or "coupled with" the other (e.g., second) component, the one component may be directly connected to the other component or may be connected to the other component through another component (e.g., third component).

The "module" used in this document includes a unit composed of hardware, software or firmware, and may be interchangeably used with a term, such as logic, a logical block, a part or a circuit. The module may be an integrated part, a minimum unit to perform one or more functions, or a part thereof. For example, the module may be composed of an application-specific integrated circuit (ASIC).

According to various embodiments, each (e.g., module or program) of the described components may include a single entity or a plurality of entities. According to various embodiments, one or more of the aforementioned components or operations may be omitted or one or more other components or operations may be added. Alternatively or additionally, a plurality of components (e.g., modules or programs) may be integrated into one component. In such a case, the integrated components may perform one or more functions of each of a plurality of components identically with or similar to that performed by a corresponding one of the plurality of components before the components are integrated. According to various embodiments, other components performed by a module, an operation or another program may be executed sequentially, in parallel, repeatedly or heuristically, or one or more of the operations may be executed in different order or may be omitted, or one or more other operations may be added.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the invention in which an exclusive property or privilege is claimed are defined as follows:

1. An operating method of an electronic device, comprising:
   extracting a first feature map from first sensing data using feature pyramid network (FPN) processing;

extracting a first region of interest (RoI) from the first feature map extracted from the first sensing data;

extracting a second feature map from second sensing data using FPN and sparse blocks network (SBNet) processing, wherein the second sensing data comprises point cloud data obtained by a radar sensor;

extracting a second RoI, corresponding to the first RoI, from the second feature map extracted from the second sensing data;

generating a third RoI by fusing the first RoI and the second RoI; and detecting a three-dimensional (3D) object based on the third RoI, wherein the first sensing data has a first resolution and a first coordinate system, and comprises image data obtained through a camera module, the first coordinate system being a 2D image coordinate system corresponding to a pixel coordinate system of the camera module, wherein the extracting of the first RoI comprises extracting, from the first feature map, the first RoI in accordance with a 3D box having a predetermined size by projecting the 3D box onto the first coordinate system using a projection matrix, wherein the first feature map has the first resolution and the first coordinate system, wherein the extracting of the second RoI comprises extracting, from the second feature map, the second RoI in accordance with the 3D box by projecting the 3D box onto a second coordinate system of the second sensing data using the projection matrix, the second coordinate system being a 3D coordinate system corresponding to a radar coordinate system of the radar sensor, wherein the detected 3D object is projected onto the first coordinate system using a projection matrix to extract a first refined RoI of the first RoI, the detected 3D object is projected onto the second coordinate system using a projection matrix to extract a second refined RoI of the second Rot the first refined RoI and the second refined RoI are fused to generate a third refined RoI of the third RoI, and a refined 3D object of the detected 3D object is further detected based on the third refined RoI.

2. The operating method of claim 1, wherein the generating of the third RoI comprises:

calculating a first weight and a second weight for the first RoI and the second RoI, respectively, the first weight for the first RoI being adaptively calculated based on a data state of the first RoI and the second weight being adaptively calculated based on a data state of the second RoI; and generating the third RoI from the first RoI and the second RoI by fusing the first RoI and the second RoI based on the adaptively calculated first weight and the adaptively calculated second weight.

3. The operating method of claim 1, wherein the detecting of the 3D object comprises detecting information on the 3D object, and wherein the information comprises at least any one of a location, size or direction of the 3D object.

4. The operating method of claim 2, wherein the generating of the third RoI based on the first weight and the second weight comprises:

obtaining a first weighted area by multiplying the first RoI by the first weight; obtaining a second weighted area by multiplying the second RoI by the second weight; and generating the third RoI by dividing a sum of the first weighted area and the second weighted area by a sum of the first weight and the second weight.

5. The operating method of claim 3, wherein the detecting of the 3D object comprises:

detecting a probability that the 3D object is to be present in the third RoI; and detecting at least any one of the location, size or direction of the 3D object based on the probability, and wherein the information further comprises the probability.

6. An electronic device comprising:

a memory;

a processor coupled to the memory and configured to execute at least one instruction stored in the memory;

a radar sensor; and a camera module, wherein the processor is configured to:

extract a first feature map from first sensing data using feature pyramid network (FPN) processing;

extract a first region of interest (RoI) from the first feature map extracted from the first sensing data, extracting a second feature map from second sensing data using FPN processing and sparse blocks network (SBNet) processing, wherein the second sensing data comprises point cloud data obtained by the radar sensor;

extract a second RoI, corresponding to the first RoI, from the second feature map extracted from the second sensing data, generate a third RoI by fusing the first RoI and the second RoI, and detect a three-dimensional (3D) object based on the third RoI, wherein the first sensing data has a first resolution and a first coordinate system, and comprises image data obtained through the camera module, the first coordinate system being a 2D image coordinate system corresponding to a pixel coordinate system of the camera module, wherein the extracting of the first RoI comprises extracting, from the first feature map, the first RoI in accordance with a first 3D box having a predetermined size by projecting the first 3D box onto the first coordinate system using a projection matrix, wherein the first feature map has the first resolution and the first coordinate system, wherein the extracting of the second RoI comprises extracting, from the second feature map, the second RoI in accordance with the 3D box by projecting the 3D box onto a second coordinate system of the second sensing data using the projection matrix, the second coordinate system being a 3D coordinate system corresponding to a radar coordinate system of the radar sensor, wherein the detected 3D object is projected onto the first coordinate system using a projection matrix to extract a first refined RoI of the first RoI, the detected 3D object is projected onto the second coordinate system using a projection matrix to extract a second refined RoI of the second RoI, the first refined RoI and the second refined RoI are fused to generate a third refined RoI of the third RoI, and a refined 3D object of the detected 3D object is further detected based on the third refined RoI.

7. The electronic device of claim 6, wherein the processor is configured to:

calculate a first weight and a second weight for the first RoI and the second RoI, respectively, the first weight for the first RoI being adaptively calculated based on a data state of the first RoI and the second weight being adaptively calculated based on a data state of the second RoI; and generate the third RoI from the first RoI and the second RoI by fusing the first RoI and the second RoI based on the adaptively calculated first weight and the adaptively calculated second weight.

8. The electronic device of claim 6, wherein:
the processor is configured to detect information on the 3D object, and
the information comprises at least any one of a location, size or direction of the 3D object.

9. The electronic device of claim 6, wherein the electronic device comprises a vehicle, and wherein the processor is further configured to:
calculate a 3D object proposal in a region proposal network (RPN) using a convolutional neural network (CNN); and
calculate a 3D object refinement using a multi-layer perceptron (MLP).

10. The electronic device of claim 7, wherein the processor is configured to:
obtain a first weighted area by multiplying the first ROI by the first weight,
obtain a second weighted area by multiplying the second ROI by the second weight, and
generate the third RoI by dividing a sum of the first weighted area and the second weighted area by a sum of the first weight and the second weight.

11. The electronic device of claim 7, wherein the processor is configured to:
determine a data state of the first RoI and a data state of the second RoI, through at least one of a convolutional neural network (CNN), a multi-layer perceptron (MLP), a regression analysis, or a support vector machine (SVM); and
calculate the first weight and the second weight based on the data state of the first RoI and the data state of the second RoI, respectively.

12. The electronic device of claim 8, wherein the processor is configured to:
detect a probability that the 3D object is to be present in the third RoI, and
detect at least any one of the location, size or direction of the 3D object based on the probability, and
the information further comprises the probability.

13. The electronic device of claim 11, wherein
as the data state of the first RoI is determined to be poorer, the first weight is calculated to be smaller, and
as the data state of the second RoI is determined to be poorer, the second weight is calculated to be smaller.

14. A non-transitory computer-readable storage medium, wherein the medium stores one or more programs for executing steps comprising:
extracting a first feature map from first sensing data using feature pyramid network (FPN) processing;
extracting a first region of interest (RoI) from the first feature map extracted from the first sensing data;
extracting a second feature map from second sensing data using FPN processing and sparse blocks network (SB-Net) processing, wherein the second sensing data comprises point cloud data obtained by a radar sensor;
extracting a second RoI, corresponding to the first RoI, from the second feature map extracted from the second sensing data;
generating a third RoI by fusing the first RoI and the second RoI; and
detecting a three-dimensional (3D) object based on the third RoI,
wherein the first sensing data has a first resolution and a first coordinate system, and comprises image data obtained through a camera module, the first coordinate system being a 2D image coordinate system corresponding to a pixel coordinate system of the camera module,
the second sensing data has a second resolution and a second coordinate system,
extracting the first RoI comprises extracting, from the first feature map, the first RoI in accordance with a 3D box having a predetermined size by projecting the 3D box onto a first coordinate system of the first sensing data using a projection matrix, and
extracting the second RoI comprises extracting, from the second feature map, the second RoI in accordance with the 3D box by projecting the 3D box onto the second coordinate system of the second sensing data using the projection matrix, the second coordinate system being a 3D coordinate system corresponding to a radar coordinate system of the radar sensor, wherein
the detected 3D object is projected onto the first coordinate system using a projection matrix to extract a first refined RoI of the first RoI, the detected 3D object is projected onto the second coordinate system using a projection matrix to extract a second refined RoI of the second RoI, the first refined RoI and the second refined RoI are fused to generate a third refined RoI of the third RoI, and a refined 3D object of the detected 3D object is further detected based on the third refined RoI,
the first feature map has the first resolution and the first coordination system, and
the second feature map has the second resolution and the second coordination system.

15. The operating method of claim 2, wherein the calculating of the first weight and the second weight comprises:
determining a data state of the first RoI and a data state of the second RoI, through at least one of a convolutional neural network (CNN), a multi-layer perceptron (MLP), a regression analysis, or a support vector machine (SVM); and
calculating the first weight and the second weight based on the data state of the first RoI and the data state of the second RoI, respectively.

16. The operating method of claim 15, wherein
as the data state of the first RoI is determined to be poorer, the first weight is calculated to be smaller, and
as the data state of the second RoI is determined to be poorer, the second weight is calculated to be smaller.

* * * * *

UNITED STATES PATENT AND TRADEMARK OFFICE
CERTIFICATE OF CORRECTION

PATENT NO. : 11,754,701 B2  
APPLICATION NO. : 17/199043  
DATED : September 12, 2023  
INVENTOR(S) : D. Kum et al.

Page 1 of 1

It is certified that error appears in the above-identified patent and that said Letters Patent is hereby corrected as shown below:

In the Claims

| Column | Line | |
|---|---|---|
| 13 | 40 | In Claim 1, change "Rot the" to -- RoI, the -- |

Signed and Sealed this  
Fifth Day of March, 2024

Katherine Kelly Vidal  
*Director of the United States Patent and Trademark Office*